United States Patent [19]

Sergerie et al.

[11] Patent Number: 5,411,781
[45] Date of Patent: May 2, 1995

[54] REINFORCED COMPOSITE BACKING TAPE

[75] Inventors: Fernand Sergerie; Robert Sergerie; Luc Sergerie, all of Timmins, Canada

[73] Assignee: Modern Carpet Tools Ltd., Timmins, Canada

[21] Appl. No.: 137,515

[22] Filed: Oct. 18, 1993

Related U.S. Application Data

[63] Continuation of Ser. No. 889,235, May 28, 1992, Pat. No. 5,254,407.

[30] Foreign Application Priority Data

May 7, 1992 [CA] Canada ................................. 2068191

[51] Int. Cl.6 ................................................ B32B 3/00
[52] U.S. Cl. ......................................... 428/57; 428/58; 428/62; 428/102; 428/156; 428/247; 428/255; 428/343; 428/354; 428/425.8
[58] Field of Search ...................... 428/354, 57, 58, 62, 428/425.8, 255, 343, 102, 156, 212, 247

[56] References Cited

U.S. PATENT DOCUMENTS 5,198,300  3/1993  Matthew et al. ................... 428/354

Primary Examiner—Patrick J. Ryan
Assistant Examiner—Richard C. Weisberger
Attorney, Agent, or Firm—Joseph W. Berenato, III

[57] ABSTRACT

A reinforced composite backing tape for securing adjoining straight edges of textile sheets, and particularly, but not exclusive, for interconnecting abutting edges of carpet pieces. The backing tape comprises an elongated reinforced backing sheet having opposed elongated parallel edges. A plurality of spaced apart, transversely disposed, rigid stabilizing bars are immovably retained over a top surface of the backing sheet. The bars are formed from a material capable of providing resistance to bending forces to provide resistance against the tape folding along an elongated seam defined along the abutting edges of the carpet pieces connected thereto to prevent carpet peaking along the abutting edges. A thermo-meltable adhesive material is disposed over the top surface of the tape and the bars to adhesively secure the tape to edge surface portions of backing material of the carpet pieces.

12 Claims, 4 Drawing Sheets

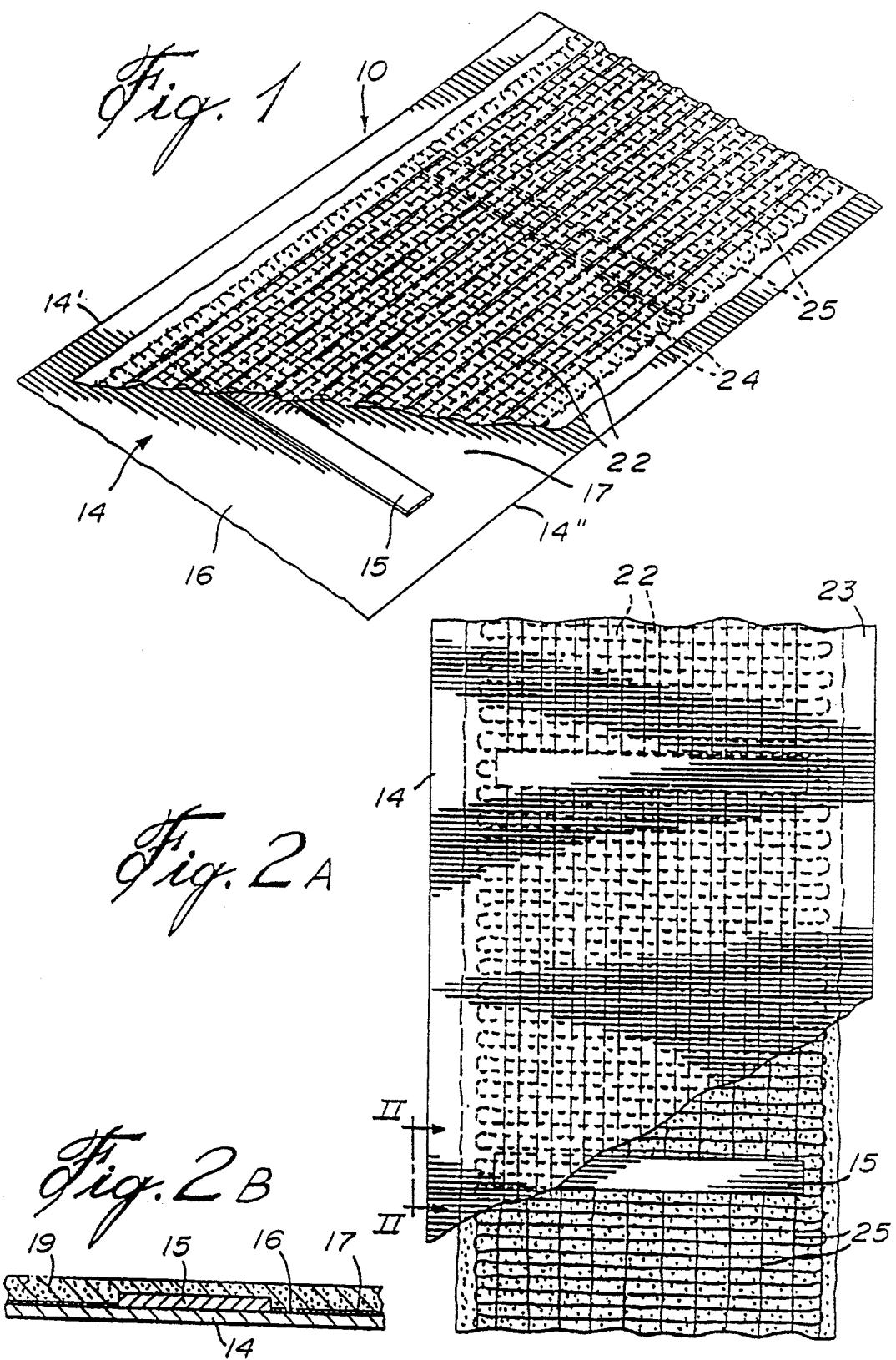

REINFORCED COMPOSITE BACKING TAPE

This is a continuation of application Ser. No. 07/889,235 filed May 28, 1992, now U.S. Pat. No. 5,254,407.

TECHNICAL FIELD

The present invention relates to an improved reinforced composite backing tape for securing adjoining straight edges of textile sheets, and particularly, but not exclusively, for interconnecting abutting edges of carpet pieces.

BACKGROUND ART

It is customary in the prior art that when constructing a seam to join together two carpet pieces along respective straight edges thereof, a tape is glued behind the carpet pieces along the seam. The tape is usually provided with beads extending there-along. In the installation, the glue is melted with a hot iron which is positioned over the top surface of the tape with the carpet pieces being positioned on the melted glue as the hot iron is moved. The carpet is pressed against the tape when the glue is hot so that the carpet will adhere to as it cools. However, during the cooling stage the tape has a tendency to arch upwards due to the opposed pulling forces by the carpet edges which have a tendency to lift. The end result is that often the carpet will peak along its formed seam resulting in a longitudinal bump within the carpet surface at the seam. To reduce this problem, weights can be placed immediately over the seam while the glue on the tape is cooling.

During installation, the carpet is stretched from the outer edges thereof to pull the carpet taut to remove bumps therein, and the carpet is engaged by the nail strips which are secured along the outer periphery of the area to be carpeted. This stretching force is applied to both carpet pieces resulting in a transverse force being applied to the tape from both sides of the tape by the carpet pieces secured thereto. The carpet thus has a tendency to want to separate at the seam, which is the weakest point. This is particularly so if the glue on the surface of the tape has not set completely into the carpet backing. The result can be a separation of the seam or the carpet seam can peak.

Another disadvantage in the assembly of the seaming tape to the backing of adjoining edge portions of carpet pieces is that because the carpets are positioned over an undercushion, usually made of polyurethane, rubber, felt, foam, or other similar material, it is difficult to apply good bonding pressure between the tape and the backing of the carpet pieces along the seam. Therefore, in order to add more resistance and support to the tape to enable the carpet installer to exert the needed downward pressure to set the carpet in the soft melted adhesive, it is customary to make the seam over a rigid floor surface area, or to position a strip of rigid board material under the seaming tape, see U.S. Pat. No. 3,660,191. These methods are very cumbersome and time consuming.

The problem of peaking is also common when carpeting a staircase wherein a seam ends up near a stair nose where the downward slant of the carpet will hinge out at the seam. Also, if a seam is disposed on an uneven or bumpy floor, peaking will occur when the undersurface of the carpet is not flat. Still further, peaking will occur where there is a joint between underlays of different thickness, such as in hallways or doorways leading to an adjoining carpeted area. The same problem occurs when the seam is close to the wall as the carpet strippers which are secured to the floor along the wall are often thinner than the underpad. In all these cases, peaking occurs at the seam because the backing tape is not rigid and offers no resistance to the upward force along the edge of the carpet pieces which have a tendency to curl upwards, and cause the backing tape to hinge and thereby forming a longitudinal fold therealong.

Particular reference is made to U.S. Pat. No. 2,552,114 which discloses a carpet joining device consisting of a saddle clip which is disposed spaced apart and transversely over a strip of paper and provided with sharp prongs or grippers on a top side which penetrate into the backing of carpet pieces to maintain them in position along a seam. These clips were particularly useful to retain the carpet pieces in immovable position when the carpet has a pattern therein to retain the alignment in the patterns on both sides of the seam of the carpet pieces. The grippers also hold the edges in abutting relationship during the stretching operation and thereafter as disclosed. During installation, a liquid glue is applied on the top surface of the backing paper.

These saddle clips are also often riveted into a floor surface to provide stability and to maintain the carpet stationary along the seam so that the stresses induced therein by stretching would not cause the seam to open, as the glue is usually still in liquid form when the carpet is being stretched. These saddle clips therefore provide for a quicker installation as it is not necessary to let the glue set completely. It is also pointed out that the grippers or prongs penetrate into the carpet pile and render it dangerous to a person walking on the carpet with bare feet. It is therefore recommended that when installing these saddle clips the grippers or prongs be bent back by striking them with a hard object, such as a hammer.

A major disadvantage of the tape as disclosed in the above-mentioned U.S. patent is that it cannot use meltable adhesive, as the prongs would prevent a hot iron from being placed in contact with the adhesive. The saddle clips must therefore be used in a method where liquid adhesive is used at the time of installation. Therefore, it is difficult and time consuming to install this type of seaming device. Still further, because of the tension that is applied to the surface of the carpet when connecting them to the peripheral grippers, these prongs can rip the backing material of the carpets along the seam area where the glue is still in liquid form, and the carpet seam can open and the saddle clip can buckle upwards and cause peaking. These saddle clips are not in common use due to these disadvantages, and particularly the fact that they are time consuming to install.

DISCLOSURE OF INVENTION

It is therefore a feature of the present invention to provide a reinforced composite backing tape which substantially overcomes the above-mentioned disadvantages of the prior art.

Another feature of the present invention is to provide a reinforced composite backing tape having a plurality of spaced apart transverse stabilizing elements immovably retained along the tape and formed of material capable of resisting to bending forces to prevent hinging of the tape and peaking of the carpet pieces along a connected seam.

According to the above features, from a broad aspect, the present invention provides a reinforced composite backing tape for securing adjoining straight edges of textile sheets, and particularly, but not exclusive, for interconnecting abutting edges of carpet pieces. The backing tape comprises an elongated reinforced backing sheet having opposed elongated parallel edges. A plurality of spaced apart, transversely disposed, straight rigid stabilizing elements are immovably retained over a top surface of the backing sheet. The stabilizing elements are formed from a material capable of providing resistance against the tape folding along an elongated seam defined along the abutting edges of the carpet pieces connected thereto to prevent carpet peaking along the abutting edges. A thermo-meltable adhesive material is disposed over the top surface of the tape and the stabilizing elements to adhesively secure the tape to edge surface portions of backing material of the carpet pieces.

BRIEF DESCRIPTION OF DRAWINGS

A preferred embodiment of the invention will now be described with reference to the accompanying drawings in which:

FIG. 1 is a perspective view of the reinforced composite backing tape of the present invention;

FIG. 2A is a plan view, partly fragmented, of the reinforced composite backing tape of FIG. 1;

FIG. 2B is a view along section lines II—II of FIG. 2A;

MODES FOR CARRYING OUT THE INVENTION

Figure 3:
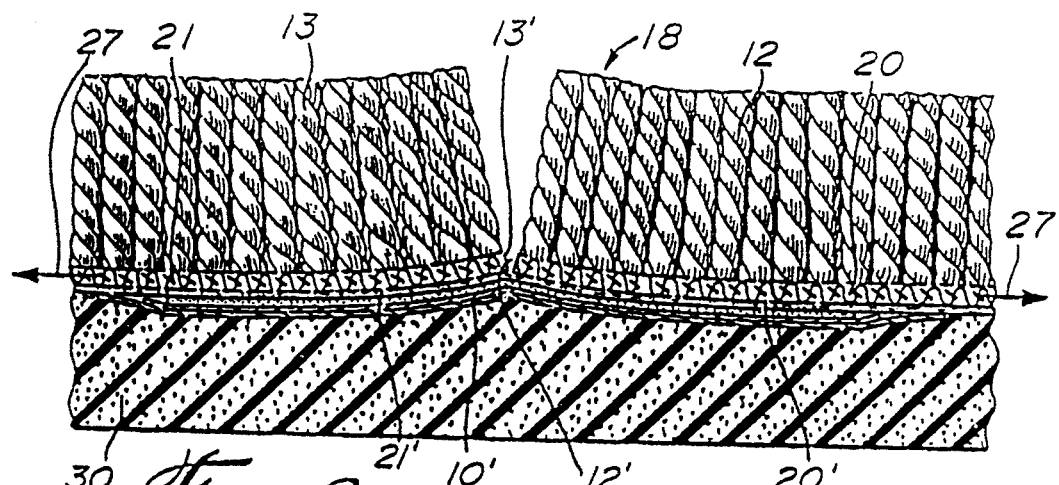
FIG. 3 is an enlarged section view along a seam formed with a backing tape of the prior art.

Referring now to the drawings, and more particularly to FIGS. 1 and 2, there is shown generally at 10 the reinforced composite backing tape of the present invention for securing adjoining straight edges 12' and 13' of adjoining carpet pieces 12 and 13, (see FIG. 3) to form a concealed seam. The tape could also be utilized to join any textile sheets together. The backing tape comprises essentially an elongated reinforced backing sheet 14 having opposed elongated parallel edges 14' and 14". The backing tape is usually stored in a roll form.

The reinforced composite backing tape of the present invention is characterized by the provision of a plurality of spaced apart, transversely disposed, straight stabilizing elements in the form of flat bars 15 which are immovably retained over the top surface 16 of the backing sheet by such means as glue 17, usually disposed over the top surface 16 of the backing sheet 14. These bars can be secured thereto by various means of assembly such as applying heat to the bars prior to depositing same on the melt able adhesive 17.

A characteristic of the flat stabilizing bars 15 is that they are constructed of a material capable of retaining its original shape when subjected to bending moments. Also, the top face of the bars must have an uninterrupted surface. By uninterrupted, we mean that there are no prongs or other forms extending out of the top surface, but the surface may have holes therein, or may have a transverse curvature. The bars as herein shown are constructed from thin spring steel material, and these are disposed in a spaced apart parallel transverse arrangement with a spacing in the range of from $2\frac{1}{2}$ to 3 inches. The main purpose of these flat bars is to provide resistance against bending forces to prevent the tape from folding or hinging along an elongated line, usually at the seam defined along the abutting edges of the carpet pieces. These bars prevent the tape from hinging and consequently the carpet from peaking along its abutting edges, such as shown at 18 in FIG. 3 with respect to carpet seams made with backing tapes of the prior art.

A thermo-meltable adhesive material 19 is disposed on the top surface 16 of the backing sheet 14 and overlies the flat bars 15, as shown in the exploded view of FIG. 2, to bond to the edge surface portions 20' and 21' of the backing material 20 and 21 of the adjoining carpet pieces 12 and 13, respectively.

As also shown in FIGS. 1 and 2, the backing tape is provided with two or more elongated beads 22 of meltable adhesive disposed spaced apart longitudinally along the top surface of the tape and over a first coat 17 of meltable adhesive. As also shown in FIGS. 1 and 2, the backing sheet 14 may be provided with a metal foil coating 23 on the top surface thereof, and a plurality of reinforced strands of non-stretchable fiber, may be secured over the top surface to reinforce the backing sheet to resist lateral stretching. On the other hand, the backing sheet may be a reinforced paper sheet formed from pulp having fibers of non-stretchable material, such as fiberglass or other strong fibers therein to resist stretching of the sheet. The reinforced strands 24 as shown in FIGS. 1 and 2 are herein constituted by parallel rows of an elongated thread, such as fiberglass or Kevlar* material, disposed in a serpentine transverse array over a major top surface portion of the backing sheet 14 and, as herein shown, are spaced inwardly from the opposed parallel edges 14' and 14" of the sheet. The flat metal bars are herein shown as being disposed between the metal foil coating 23 and the reinforced strands 24. However, the bars may be positioned over the reinforced strands and secured thereto by the multiple adhesive beads 22, or by the adhesive 17 holding the strands onto the backing sheet. The strands are maintained in the serpentine parallel position, as herein shown, by stitches 25 extending longitudinally thereacross.

Figure 4:
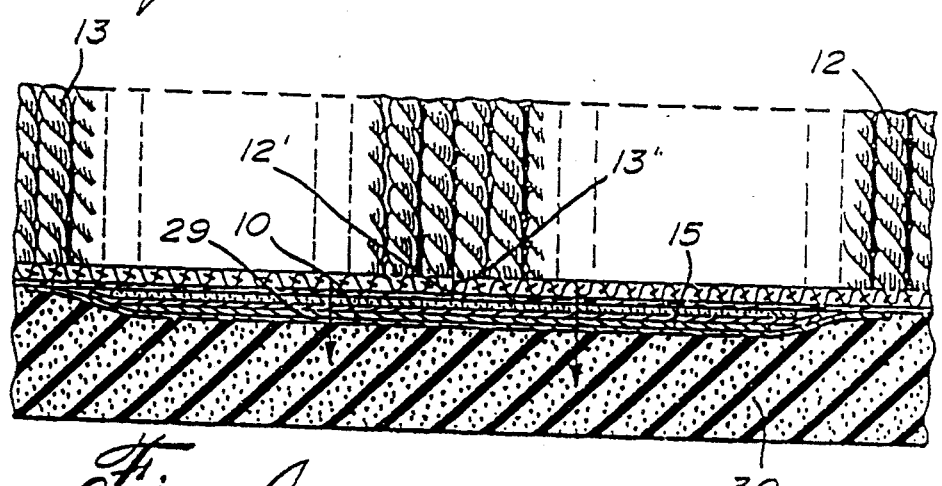
FIG. 4 is a section view similar to FIG. 3 but showing the reinforced backing tape of the present invention secured along the carpet seam.

As shown in FIG. 3, when the backing 20 and 29 of the carpet pieces 12 and 13 are subjected to stretching when securing the carpet along the edge of a wall to carpet strippers 28, (see FIG. 7), the backing material is subjected to a pulling force along the direction of arrows 27, shown in FIG. 3, thus applying opposed pulling forces along the seam. This pulling force causes the seam to open and buckle up or peak, such as illustrated in FIG. 3. With the backing tape 10' of the prior art, the tape hinges up or bends along the seam line, as herein illustrated. However, as shown in FIG. 4, the metal bar inserts 15 of the present invention provide a resistance against the tape which is subjected to pulling forces of the carpet pieces in the direction of arrows 29 preventing the tape 10 of the present invention to buckle up, and therefore preventing peaking of the carpet pieces 12 and 13 along their abutted seam edges 12' and 13'. As also illustrated in both FIGS. 3 and 4, these carpets are usually laid over a foam undercarpet 30 and the bars 15 provide rigidity to the tape sitting on the foam underpad and onsequently better contact with a hot iron (see FIG. 9) and the backing of the carpet pieces.

Figure 5:
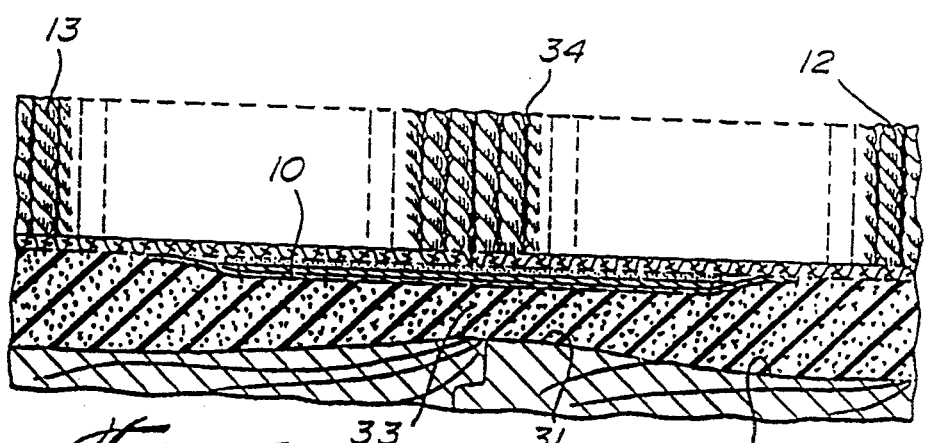
FIG. 5 is a further enlarged section view showing a seam using the reinforced composite backing tape of the present invention and wherein the seam is located over a bump in a floor surface.

FIG. 5 illustrates another advantage of the reinforced composite tape of the present invention and particularly wherein the seam crosses over an irregularity, such as the bump 31, in the floor surface 32. The rigidity of the composite backing tape 10 of the present invention would slightly compress the undercarpet in the region 33 between the tape 10 and the irregularity 31, thus maintaining a more uniform top carpet surface 34.

Figure 6:
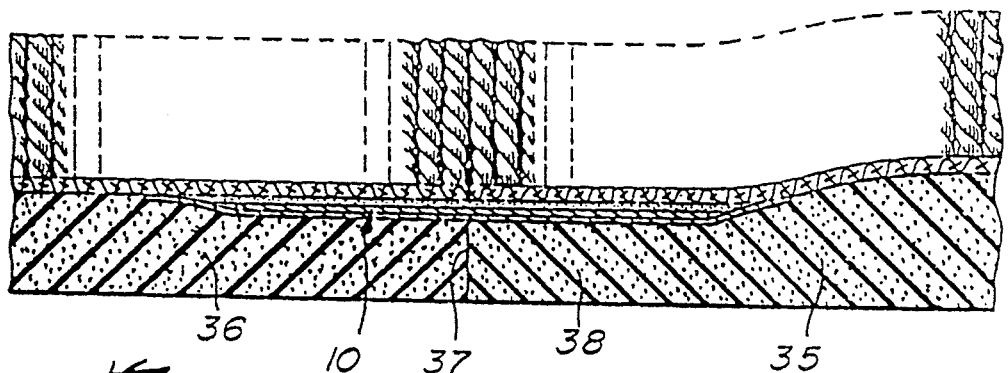
FIG. 6 is a further enlarged section view along a carpet seam showing the reinforced composite backing tape of the present invention, and wherein the seam is located at the intersection of underpads of different thicknesses.

FIG. 6 shows another advantage of the reinforced composite backing tape of the present invention wherein the seam bridges two different underpads 35 and 36 having different thicknesses. This is common when carpets are installed next to existing carpeted areas. The tape of the present invention would smooth out tile transition between these underpads 35 and 36 making the transition more gradual than abrupt, as would be the case with tape of the prior art which would hinge up at the juncture 37 of the two underpads if the seam was made there. As herein shown the thicker pad 35 is compressed in the area 38 by the flat bars provided in the tape.

Figure 7:
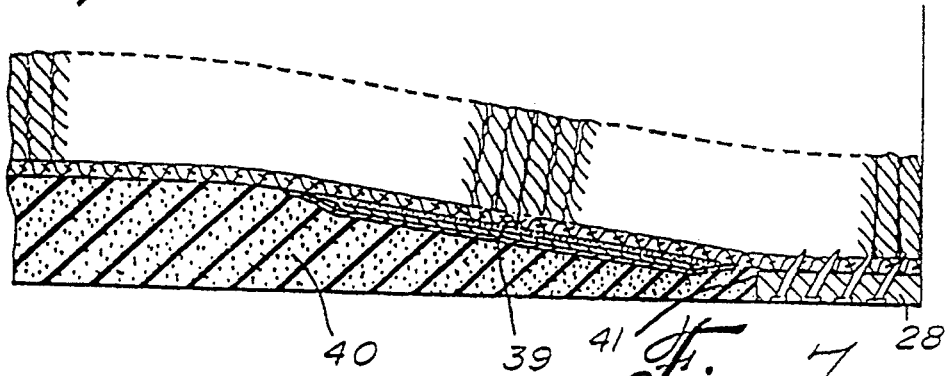
FIG. 7 is an enlarged section view illustrating a seam formed closely spaced to carpet strippers.

FIG. 7 shows another advantage wherein a seam 39 may be positioned close to the carpet strippers 28 which are usually much thinner than the foam underpad 40. It also prevents an abrupt demarkation in the carpet at the juncture 41 between the underpad and the carpet stripper.

Figure 8:
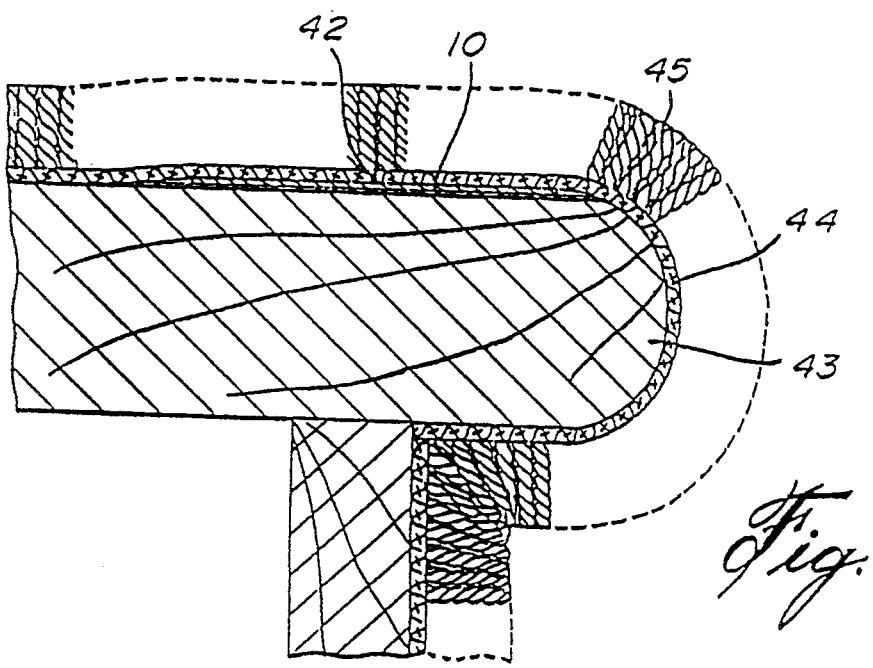
FIG. 8 is another section view showing a seam disposed close to the nose of a stair.

FIG. 8 shows a still further advantage wherein the seam 42 is located close to a stair nose 43. The reinforced tape 10 again prevents buckling due to the pulling force on the carpet piece 44 extending over the nose portion 43, and in an area where the carpet strands 45 have a tendency to open.

Figure 9:
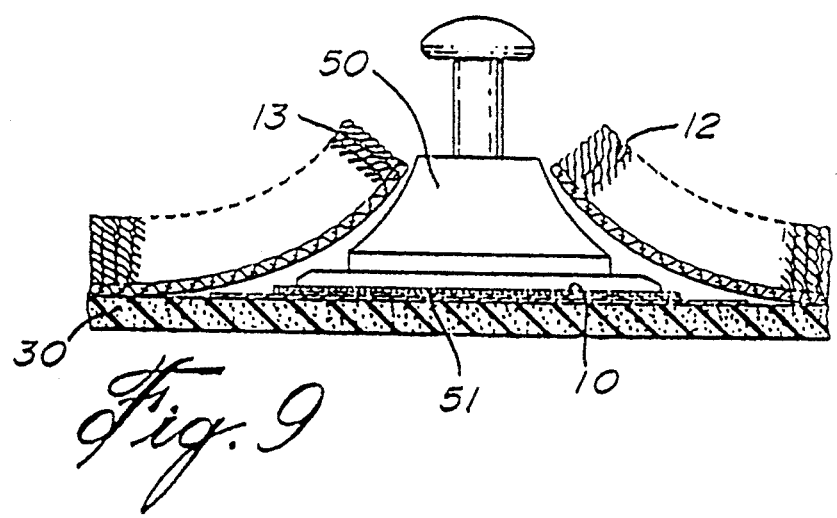
FIG. 9 is a section view showing a hot iron positioned over the reinforcing tape to melt the adhesive thereon with the carpet pieces hinged outwardly alongside the hot iron.

FIG. 9 illustrates another advantage of the reinforced tape 10 of the present invention. The tape is disposed over the foam backing material 30 which is a fairly soft material. The flat metal bars, as previously described, provide stability in the tape permitting a good contact between the bottom heating surface 51 of the hot melting iron 50 to provide for the melting of the adhesive on the top surface thereof. This hot melting iron is positioned in an opening between the carpet pieces 12 and 13, in the manner illustrated, and is drawn along the seam, and as this is done, the carpet folds back into position over the melted adhesive and become secured thereto. As this is done, the carpet installer applies downward pressure on the hot iron compressing the backing foam. Because the tapes of the prior art are pliable, it is difficult to maintain even contact with the top surface of the tape due to the foam backing material. This is the reason why most seams with the technique of the prior art are done on a hard backing as previously described. With the present invention this is not necessary. It can also be seen from this drawing that, as the hot iron is drawn along the tape, it also heats the carpet backing surfaces which rest on the side wall of the heating iron, and with the tapes of the prior art causes the problem previously described.

Figure 10:
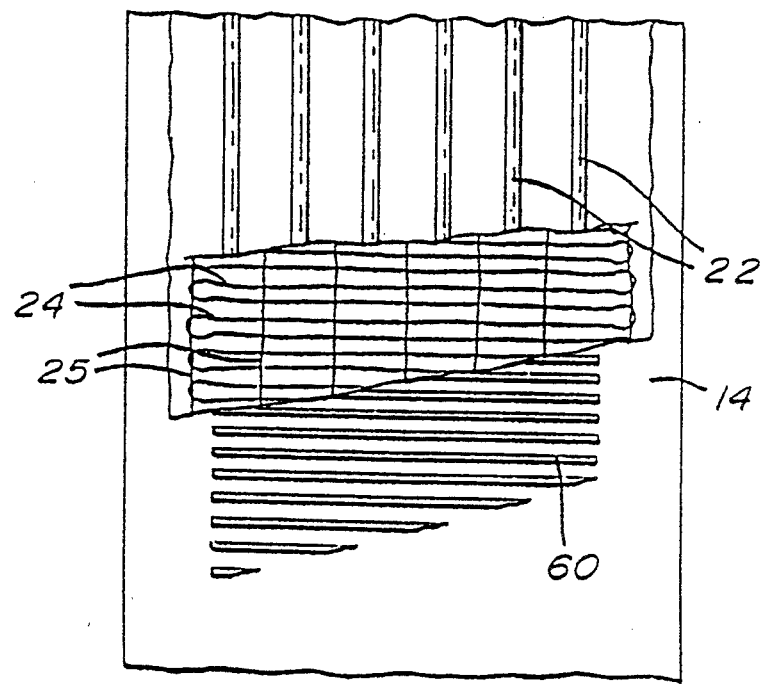
FIG. 10 is a plan view of a tape and wherein the stabilizing elements are metal wire rods.

FIG. 10 illustrates a still further modification and wherein the stabilizing elements are steel wire rods 60 positioned closely spaced on the tape 14. These rods can be applied by various means such as a carrier tape or netting, not shown. It is also foreseen that the stabilizing elements may have other forms and be constructed of other materials, provided it can achieve the desired result of preventing the tape from hinging and eliminating a seam of two carpet pieces from peaking.

It is within the ambit of the present invention to cover any obvious modifications of the preferred embodiment described herein, provided such modifications falls within the scope of the appended claims.

We claim:

1. A carpet tape, comprising:
   a) an elongated length of a backing sheet having laterally spaced parallel edges, said sheet having a metal foil coating on a first surface thereof;
   b) a plurality of longitudinally spaced metal bars overlying said coating and extending generally transverse to said edges;
   c) an array of reinforcing strands overlying said bars and exposed portions of said coating; and
   d) an adhesive material securing said bars to said array, said material being meltable for thereafter being adapted to adhesively secure adjacent carpet edges.

2. The tape of claim 1, wherein:
   a) said adhesive material arrayed in a plurality of spaced beads extending longitudinally relative to said sheet.

3. The tape of claim 2, wherein:
   a) said beads extend in parallel.

4. The tape of claim 1, wherein:
   a) each of said bars is formed from spring steel.

5. The tape of claim 4, wherein:
   a) said bars are disposed in parallel; and
   b) said bars are spaced apart a distance of from about 2.5 to about 3 inches.

6. The tape of claim 5, wherein:
   a) each of said bars is rectangular in plan.

7. The tape of claim 1, wherein:
   a) said strands are formed from a non-stretchable fiber material.

8. The tape of claim 7, wherein:
   a) said fiber material is chosen from the group consisting of fiberglass and Kevlar.

9. The tape of claim 7, wherein:
   a) said strands are configured in a plurality of parallel rows;
   b) said bars are disposed in parallel; and
   c) said rows extend parallel to said bars.

10. The tape of claim 9, wherein:
    a) a plurality of stitches extend longitudinally along said strands for maintaining said strands in said parallel rows.

11. The tape of claim 1, wherein:
    a) said adhesive material is thermosettable.

12. The tape of claim 11, wherein:
    a) said adhesive material has a thickness exceeding the thickness of said bars.

* * * * *